US008084140B2

(12) United States Patent
Goia et al.

(10) Patent No.: US 8,084,140 B2
(45) Date of Patent: Dec. 27, 2011

(54) SILVER PLATELETS COMPRISING PALLADIUM

(75) Inventors: Dan V. Goia, Potsdam, NY (US); Brendan P. Farrell, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 947 days.

(21) Appl. No.: 11/913,284

(22) PCT Filed: Dec. 1, 2006

(86) PCT No.: PCT/US2006/061492
§ 371 (c)(1),
(2), (4) Date: Oct. 31, 2007

(87) PCT Pub. No.: WO2007/065154
PCT Pub. Date: Jun. 7, 2007

(65) Prior Publication Data
US 2008/0213592 A1    Sep. 4, 2008

Related U.S. Application Data

(60) Provisional application No. 60/742,031, filed on Dec. 2, 2005.

(51) Int. Cl.
*B32B 5/16* (2006.01)
*C22C 5/06* (2006.01)

(52) U.S. Cl. ............. 428/547; 75/255; 75/331; 75/351; 428/402; 977/810

(58) Field of Classification Search .................. 428/402, 428/547; 75/255, 331, 351; 977/810
See application file for complete search history.

(56) References Cited

U.S. PATENT DOCUMENTS

| 5,785,897 A * | 7/1998 | Toufuku et al. ............... 252/514 |
|---|---|---|
| 6,290,749 B1 * | 9/2001 | White et al. .................... 75/721 |
| 6,451,433 B1 * | 9/2002 | Oka et al. ...................... 428/432 |
| 6,645,444 B2 * | 11/2003 | Goldstein ......................... 423/1 |
| 6,660,058 B1 * | 12/2003 | Oh et al. .......................... 75/351 |
| 6,660,680 B1 * | 12/2003 | Hampden-Smith et al. .. 502/180 |
| 6,916,872 B2 * | 7/2005 | Yadav et al. ................... 524/430 |
| 7,135,054 B2 * | 11/2006 | Jin et al. ........................... 75/255 |
| 7,172,663 B2 * | 2/2007 | Hampden-Smith et al. .. 148/537 |
| 7,270,694 B2 * | 9/2007 | Li et al. ............................ 75/351 |
| 7,585,349 B2 * | 9/2009 | Xia et al. ......................... 75/371 |
| 7,625,637 B2 * | 12/2009 | Kim .............................. 428/570 |
| 7,776,442 B2 * | 8/2010 | Sato ............................... 428/402 |
| 7,842,274 B2 * | 11/2010 | Goia et al. ..................... 423/604 |
| 2002/0034675 A1 * | 3/2002 | Starz et al. ...................... 429/42 |
| 2006/0073667 A1 * | 4/2006 | Li et al. .......................... 438/311 |
| 2006/0090598 A1 * | 5/2006 | Goia et al. ....................... 75/371 |
| 2007/0234851 A1 * | 10/2007 | Goia et al. ....................... 75/371 |

OTHER PUBLICATIONS

Goia, Preparation and formation mechanisms of uniform metallic particles in homogeneous solutions, J. Mat. Chem. (2004) 14, 451-458.*
Pastoriza-Santos et al., Synthesis of Silver Nanoprisms in DMF, Nano Lett. (2002) vol. 2, No. 8, 903-905.* Vasan & Rao, Nanoscale Ag-Pd and Cu-Pd Alloys, J. Mater. Chem., 1995, 5(10), 1755-1757.*
Jana et al, Wet chemical synthesis of silver nanorods and nanowires of controllable aspect ratio, Chem. Commun., 2001, 617-618.*
Farrell et al., Highly dispersed silver nanoplatelets as precursors for ultra-thin conductive layers, Proceedings CARTS USA 2006, Apr. 3-6, 2006.*
Farrell et al, Alloy and Core-shell silver/palladium platelets for ultra-low fire MLCC's, Proceedings CARTS USA07, 2007.*

* cited by examiner

*Primary Examiner* — Hoa (Holly) Le
(74) *Attorney, Agent, or Firm* — George R. McGuire; Blaine T. Bettinger; Bond Schoeneck & King

(57) ABSTRACT

The invention provides an aqueous solution-based method for producing nanosized silver platelets, which employs the controlled mixing of a silver ion solution, a reducing solution, and an acidic solution in the presence of palladium ions.

13 Claims, 7 Drawing Sheets

US 8,084,140 B2

SILVER PLATELETS COMPRISING PALLADIUM

CROSS REFERENCE TO RELATED APPLICATIONS

This application is a national phase filing under 35 U.S.C. 371 of International Application No. PCT/US2006/061492, filed on Dec. 1, 2006, which claims the benefit of U.S. Provisional Application Ser. No. 60/742,031, filed Dec. 2, 2005, the entirety of which is hereby incorporated herein by reference for the teachings therein.

This application claims priority to US Provisional Application Ser. No. 60/742,031, filed Dec. 2, 2005, which is incorporated herein by reference in its entirety.

FIELD OF THE INVENTION

The present invention relates to the field of nanotechnology and nanoscale materials, and in particular to nanoscale silver platelets and methods for their production.

BACKGROUND OF THE INVENTION

With their outstanding thermal and electrical conductivities, silver platelets and silver flakes are an important class of materials, with applications in many industries, such as the electronics industry, to generate electrically conductive structures and to provide EMI shielding.

A variety of methods have been used to prepare silver flakes or silver platelets, such as vertical freezing, ball milling, epitaxial growth, gas evaporation, vacuum deposition, Langmuir-Blodgett films, and chemical precipitation. The silver flakes used in the electronic industry are almost exclusively produced by milling silver powders in various solvents in the presence of suitable lubricants (See, e.g., U.S. Pat. No. 4,859,241 to Grundy). The flattening of the silver particles results from mechanical forces (shear and impact) provided by the movement of the milling media, which usually contains 1-5 mm spheres of materials of different densities and compositions (glass, stainless steel, or ceramics). Because the majority of the silver powders used in the milling process contain large agglomerates of sub-micrometer or micrometer size particles, milling almost always leads to the formation of silver flakes with large average particle sizes (5-20 μm) and broad size distributions. Such materials are becoming less and less suitable for each succeeding generation of electronic devices, which require increasingly thinner and smaller conductive structures. Furthermore, friction- and impact-induced wear of the milling media leads to contamination of the resulting silver flakes, thereby reducing the product quality.

Precipitation-based silver flake production is a promising technology for meeting the demands of the electronic industry. For example, nano-size silver flakes with edges up to about 110 nm have been produced by reducing silver nitrate with hydrazine at the interface of a water/octylarnine bi-layer system (Yener et al., *Langmuir* (2002) 18:8692-99). However, such a system is not environmentally friendly, and would be complex and costly on a commercial scale. Silver platelets in the 30-120 nm size range were produced by irradiation of silver nanospheres (R. Jin et al., *Nature* (2003) 425:487-90), but this is a two-step process; furthermore, photochemical processes are rarely amenable to commercial-scale production.

There is a need in the art for silver flakes with widths in the range of 0.1 to 1 μm that can be produced economically on a commercial scale. Consequently, there is great interest in the development of new, cost-effective, and environmentally friendly protocols that are capable of producing uniform silver flakes on a commercial scale.

SUMMARY OF THE INVENTION

The present invention provides methods for producing nanometer-scale silver platelets, which include the essentially simultaneous addition of a silver ion solution and a reducing solution to an acidic solution under conditions that permit the reduction of silver ions to metallic silver particles, wherein the silver ion solution contains a plurality of silver ions; the reducing solution contains one or more reducing agents; the acidic solution contains one or more stabilizing agents; and at least a part of the reduction of the silver ions and concurrent formation of the silver particles occurs in the presence of a plurality of palladium ions.

In one embodiment, the reducing agent is either ascorbic acid or isoascorbic acid. In another embodiment, the acidic solution contains gum arabic. In yet another embodiment, the silver ion solution contains a plurality of palladium ions, and in still another embodiment, the reducing solution further contains gum arabic as a stabilizing agent.

Also provided are silver platelets produced according to the methods of the present invention, and compositions including such silver platelets.

The present invention further provides a metallic nanoplatelet containing at least about 90% silver and less than about 10% palladium, and compositions including the same.

Other features and advantages of the present invention will become apparent from the following detailed description. It should be understood, however, that the detailed description and the specific examples, while indicating the preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
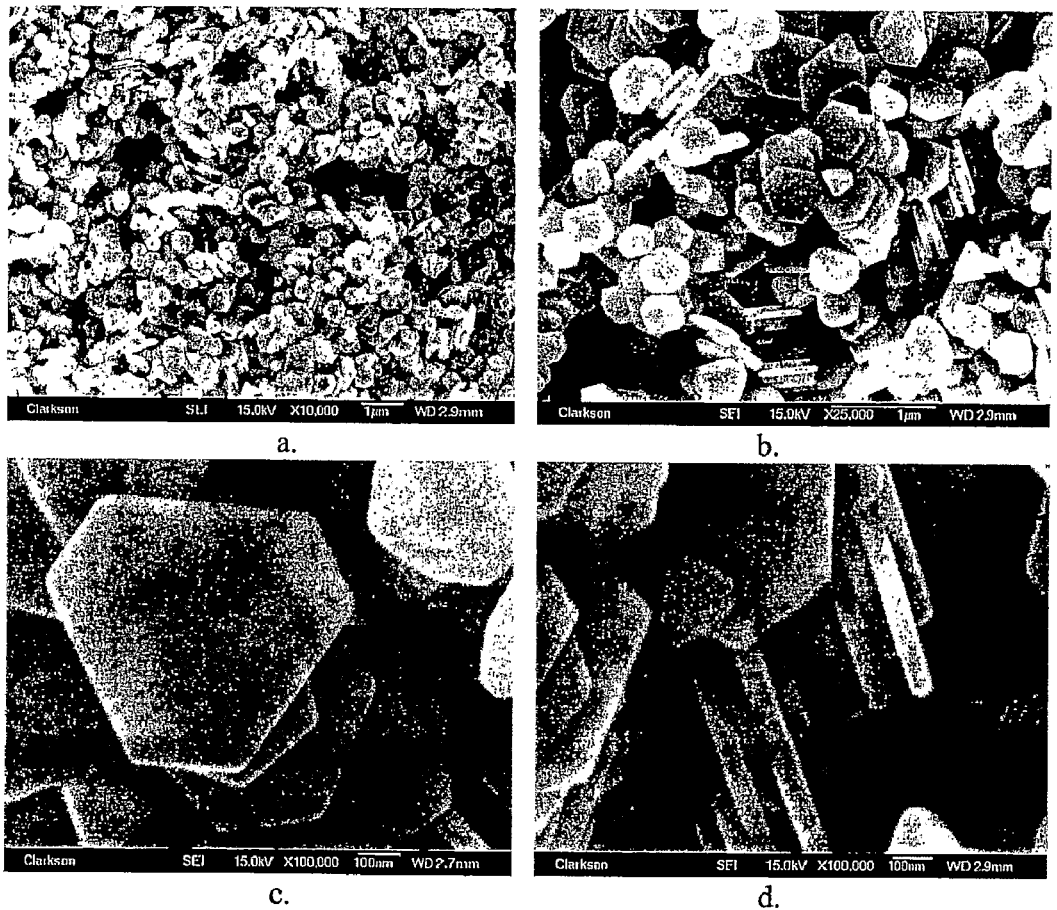
FIG. 1 shows FE-SEM images of silver platelets produced as described in Example 1. The images were obtained using a JEOL JSM-7400F system at 15 kV accelerating voltage. Magnifications: (a) 10,000×; (b) 25,000×; (c) 100,000×; and (d) 100,000×.

As used herein and in the appended claims, the singular forms "a," "an," and "the" include plural references, unless the content clearly dictates otherwise. Thus, for example, reference to "a silver platelet" includes a plurality of such platelets and equivalents thereof known to those skilled in the art, and reference to "a reducing agent" is a reference to one or more reducing agents and equivalents thereof known to those skilled in the art, and so forth. All publications, patent applications, patents, and other references mentioned herein are incorporated by reference in their entirety.

The term "nano-platelet" as used herein refers to particles having a thickness of about 10 nm to about 500 nm, an average diameter or width of about 100 nm to about 1000 nm, and an aspect ratio (width/thickness) ranging from about 2 to about 50.

The present invention provides a simple, cost-effective, and environmentally-friendly chemical method for producing smaller, thinner, and more uniform silver particles than have previously been available. More specifically, the method according to certain embodiments of the invention produces flat metallic particles having a thickness of about 20 nm to about 300 nm, a width of about 100 nm to about 1000 nm, and an aspect ratio (width/thickness) ranging from about 2 to about 20. In some embodiments, a majority of the nano-platelets are characterized by an axis of symmetry, which is typically (but not limited to) 3-fold symmetry.

The inventors have previously demonstrated the preparation of uniform, isometric nano-sized silver particles in acidic solutions, by the reduction of silver ions with ascorbic acid in the presence of various dispersants (US Publication. No. 2006/0090598 to Goia et al., which is incorporated by reference in its entirety). The inventors have now devised a method for producing uniform, nano-sized, anisotropic silver particles, i.e., silver nano-platelets, by manipulating the conditions for nucleation and early stages of particle growth in an acidic reducing system.

In at least one embodiment, the present invention provides a system which produces silver platelets, and also the silver platelets produced thereby, that includes essentially simultaneous addition of a silver ion solution and a reducing solution to an acidic solution under conditions that permit the reduction of a silver ion to metallic silver, thereby producing the silver platelets.

As used herein, the expression "essentially simultaneous" refers to addition of the silver ion solution and the reducing solution to the acid solution under one or more of the following conditions: (1) the time period during which addition of one solution is carried out overlaps a majority of the time period during which the other solution is carried out; (2) the starting times for adding the two solutions do not differ by more than 10% of the total time for complete addition of the solutions; and (3) the completion times for addition of the two solutions do not differ by more than 10% of the total time for complete addition of the solutions.

Unlike the binary system known in the art by Yener et al., where silver platelets are formed at the lamellar bilayer interface of a hydrophobic organic compound-water system, the system of the present invention is a single phase system in which silver platelets are formed in and precipitated out of an aqueous solution.

The silver ion solution contains a plurality of silver ions, and can optionally contain palladium ions. For example, a silver ion solution may contain about 0.94 M $Ag^+$ and about 0.02 M $Pd^{2+}$. In another example, a silver ion solution may contain about 0.99 M $Ag^+$. The silver ion solution can be prepared using any silver compound(s) known in the art which releases silver ions into solution to be reduced by a reducing agent to form metallic silver particles. In one preferred embodiment, the silver compound is silver nitrate.

The silver ion solution can be a homogenous solution, a gradient solution, or a combination of solutions continuously or substantially continuously applied during the process of the present invention. A gradient solution contains at least one non-uniformly-distributed substance. The gradient can be of any type, for example a linear gradient, a non-linear gradient, or a step gradient. The non-uniformly-distributed substance can be a plurality of palladium ions. The inventors have discovered that if, during the nucleation and the early stages of particle growth, nitric acid (0.1-4.5 $mol.dm^{-3}$) is provided and $Pd^{2+}$ ions are present, (introduced, for example, in the silver nitrate solution at 0.5-10% based on the weight of silver), the growth mechanism of the metallic particles changes from isotropic growth to anisotropic growth, and highly dispersed silver nano-platelets are eventually formed. In one embodiment, the silver ion solution comprises a preceding portion and a succeeding portion, wherein the preceding portion of the silver ion solution contains a plurality of silver and palladium ions. The preceding portion and the succeeding portion can be part of one solution, or be different solutions separately prepared and applied during the process of the present invention.

The reducing solution of the present invention contains a reducing agent. The term "reducing composition," or "reducing agent," as used herein, generally includes any water soluble reducing substance, and combinations thereof, which is capable of reducing silver ions to metallic silver. Suitable reducing agents include, without limitation, acids, aldehydes, aldoses, monohydroxylic and polyhydroxylic alcohols (polyols), hydrazine, various boron and aluminum hydride species, and reducing saccharides (including monosaccharides, oligosaccharides, and polysaccharides), as well as, where applicable, their sodium, potassium, and ammonium salts. In preferred embodiments, the reducing agent is ascorbic acid or isoascorbic acid. For example, a suitable reducing solution of the present invention is a 20% w/v solution of ascorbic acid in water.

The reaction mixture of the present invention can contain a stabilizing agent. The stabilizing agent can be present in one or more of the silver ion solution, the reducing solution, and the acidic solution. In one embodiment, both the reducing solution and the acidic solution contain a stabilizing agent.

The term "stabilizing composition," or "stabilizing agent," as used herein, generally includes any water-soluble stabilizing substance which is capable of dispersing and stabilizing the newly formed silver nano-platelets in the reaction mixture, thus preventing undesirable aggregation of these particles. Suitable stabilizing agents are known in the art, and include, without limitation, water soluble resins (including, e.g., naturally occurring, synthetic, and semi-synthetic water soluble resins), gum arabic, water soluble polymers, water soluble polysaccharides, water soluble glycoproteins, various water soluble salts of naphthalene sulfonic-formaldehyde copolymers, and combinations thereof. In preferred embodiments of the present invention, the stabilizing agent is gum arabic.

In certain embodiments, the amount of halide in the raw materials is controlled so as to be as low as possible, because the formation of nano-platelets is favored at low levels of halides. Keeping the level of halides, for example, chloride, at or below 20 ppm on a silver metal basis promotes the formation of nano-platelets over spherical particles.

The stabilizing agent can be removed after the formation of the nano-platelets is complete. A number of protocols for removing the stabilizing agent are known in the art, such as, acid, alkaline, and/or enzymatic hydrolysis. In one embodiment, gum arabic is removed from the reaction mixture after the reaction through alkaline hydrolysis. For example, the hydrolysis of gum arabic may be performed for an extended time at high temperature (e.g., between about 60° and about 100° C., or between about 70° and about 90° C., or between about 78° and about 88° C.) and at high pH (e.g., pH 11.5). It is generally desirable to maintain the pH of the mixture during the hydrolysis between about 8 and about 14, preferably between about 10 and about 13, and more preferably between about 10.5 and about 12. The duration of the hydrolysis can depend upon a number of factors, such as temperature, pH, and the amount of stabilizing agent (e.g. gum arabic) present. For example, the hydrolysis of gum arabic can generally be performed for about 0.2 to 10 hours, or about 0.5 to 5 hours, or about 1 to 3 hours.

The acidic solution of the present invention contains an acid, and optionally a stabilizing agent. For example, the acidic solution can be prepared by dissolving 2.3 g of gum arabic in 320 ml $H_2O$, followed by the addition of 20 ml of concentrated $HNO_3$. In certain embodiments, the concentration of the nitric acid is from about 0.1 to about 4.5 M.

The resulting silver platelets can be isolated following standard protocols known in the art, such as by precipitation, filtration, and centrifugation. In one embodiment, centrifugation facilitates the production of silver platelets with a smaller size. For example, the reaction is carried out in a continuous centrifuge under conditions wherein the silver platelets with a smaller size precipitate without causing substantial aggregation of the nano-platelets. The particles can then be washed, for example by using methanol or ethanol, and dried, such as by air, $N_2$, or vacuum.

In one embodiment, the silver platelets contain about 90% or more silver and 10% or less palladium. In another embodiment, the silver platelets contain about 99.1% or more silver, and about 0.8% or less palladium. In still another embodiment, the silver platelets contain about 0.2% palladium. The incorporation of a trace amount of palladium into the silver platelet of the present invention can significantly reduce the migration problems which are known to affect all silver-based particles, flakes, and platelets.

The silver platelets produced in accordance with the present invention have a thickness of about 10 nm to about 300 nm, or about 40 to about 200 nm. In one embodiment, the silver platelets have an average thickness of about 60 to about 100 nm.

The silver platelets produced in accordance with the present invention have a width of about 100 nm to about 1000 nm. In one embodiment, the silver platelets have an average width of about 500 nm to about 1000 nm. The silver platelets of the present invention can be highly uniform in size.

In one embodiment, the method of the present invention produces compositions of silver platelets that have a tight size distribution for the width and/or thickness (See Table 1). The breadth of a size distribution, as used herein, refers to the degree of variation in the dimension of interest of the silver platelets in a composition. In preferred embodiments, at least about 90% of the silver nano-platelets have a width within the range of W±25% W, where W is the mean width of the silver platelets. In further preferred embodiments, at least about 80% of the silver nano-platelets have a thickness within the range of T±20% T, where T is the mean thickness of the silver platelets. The thickness and width of the silver platelets can be measured by a number of techniques, such as, by electron microscopy, particularly, scanning electron microscopy (e.g., using a field emission scanning microscope).

The uniformity of the silver platelets produced in accordance the present invention can also be characterized by the aspect ratio (width/thickness) of the nano-platelets. The aspect ratio of the silver platelets can range from about 2 to about 20.

In addition, in one embodiment, the silver platelets of the present invention can be highly crystalline. The term "degree of crystallinity," as used herein, refers to the ratio between the size of the constituent crystallites and the thickness of the nano-platelets. The size of the constituent crystallites can be deduced from X-ray diffraction (XRD) measurements using Sherrer's equation, while the thickness of the nano-platelets can be determined by electron microscopy. A larger ratio of the size of the constituent crystallites in comparison to the thickness of the silver platelets indicates an increased degree of crystallinity. In one embodiment, the silver nano-platelets have a high degree of crystallinity if at least about 80%, preferably, at least about 85%, more preferably, at least about 90-95%, and even more preferably, about 100% of the silver nano-platelets are highly crystalline.

The silver nano-platelets of the present invention can be substituted, wholly or in part, for prior art silver flake and silver powder compositions in many applications. For example, conductive inks, coatings, and adhesives can comprise silver nano-platelets according to the invention, together with thermoplastic and/or thermosetting polymers, solvents, and various additives such as binders, stabilizers, Theological modifiers, and surfactants. Solvents, polymers, and additives suitable for use in conductive inks, coatings, and adhesives are well-known in the art; see for example U.S. Pat. No. 6,379,745 (which is incorporated herein by reference) and references cited therein. Another potential application for the silver nano-platelets is as an antimicrobial agent, in view of the well-known antimicrobial and antifungal properties of silver nano-particles.

EXAMPLES

The following examples illustrate specific embodiments of the present invention. They are set forth to aid in the understanding of the invention, and should not be construed to limit in any way the scope of the invention as defined in the claims.

Materials: Silver nitrate ($AgNO_3$) was obtained from Ames Goldsmith Corp. (Glens Falls, N.Y.). Palladium nitrate (Pd($NO_3$)$_2$) was obtained from Umicore (Belgium). Gum arabic was obtained from Frutarom Incorporated (North Bergen, N.J.). Nitric and hydrochloric acids were obtained from Fisher Scientific Co. (Fair Lawn, N.J.). Ascorbic Acid was obtained from Roche Vitamins Inc. (Parsippany, N.Y.). Deionized ("DI") water was used throughout.

Example 1

Preparation of Silver Platelets (A) Precipitation Process

The silver nano-platelets were prepared by the double-jet addition of silver nitrate ($AgNO_3$) and ascorbic acid solutions into a highly acidic solution of gum arabic in water. To generate the metallic particles as very small nano-platelets, the total volume of silver nitrate solution (160 ml) was divided into two distinct parts ($A_1$ and $A_2$). The first part of the solution ($A_1$) was prepared by dissolving 1.91 g $AgNO_3$ in 11.14 ml $H_2O$ and then adding 0.275 g $Pd(NO_3)_2$ solution (9.0% Pd metal) to provide a concentration of 0.94 M Ag and 0.02 M Pd (final volume: 12 ml). The second part ($A_2$) was prepared by dissolving 23.24 g $AgNO_3$ in $H_2O$ (final volume: 148 ml), to provide an $AgNO_3$ solution with a concentration of 0.99 M Ag. The reducing solution was prepared by dissolving 32 g ascorbic acid and 1.5 g gum arabic in 160 ml $H_2O$. The acidic solution was prepared by dissolving 2.3 g gum arabic in 320 ml $H_2O$, followed by the addition of 20 ml of concentrated $HNO_3$.

The precipitation was carried out by the addition, in parallel, of the metallic precursor solutions (first the $A_1$ solution followed immediately by the $A_2$ solution) and the ascorbic acid solution, over 90 minutes, into the 320 ml of acidified gum arabic solution, at room temperature and with moderate agitation.

The time for introducing the reducing solution (containing ascorbic acid) and the total time for introducing the solutions containing silver ion, did not differ by more than 3 minutes.

(B) Hydrolysis of Gum Arabic

The excess of gum arabic was removed by increasing the pH of the silver platelet dispersion to 11.5 with 10.0 N sodium hydroxide and heating the mixture to about 85° C., for 1 hour.

(C) Processing the Silver Platelets

When the hydrolysis of the gum arabic was complete, the dispersion was allowed to cool and the silver platelets were allowed to settle. The supernatant was discarded, and the silver platelets were washed twice with DI water. A third wash was carried out with 50% ethanol in DI water, and two more washes with pure alcohol were performed. The platelets were dried overnight on filter paper at room temperature.

(D) Platelet Characterization

The morphology and size of the silver nano-platelets produced were analyzed by field emission scanning electron microscopy (FE-SEM) using a JEOL JSM-7400F device at 15 kV accelerating voltage and a magnification between 10,000× and 650,000×.

FIG. 1 shows the FE-SEM images of the silver platelets obtained by the process described above. A large majority of the metallic particles were crystalline silver platelets, with an average thickness of about 60 nm and an average width of 0.725 μm, for an average aspect ratio (width/thickness) of 12.

Figure 2:
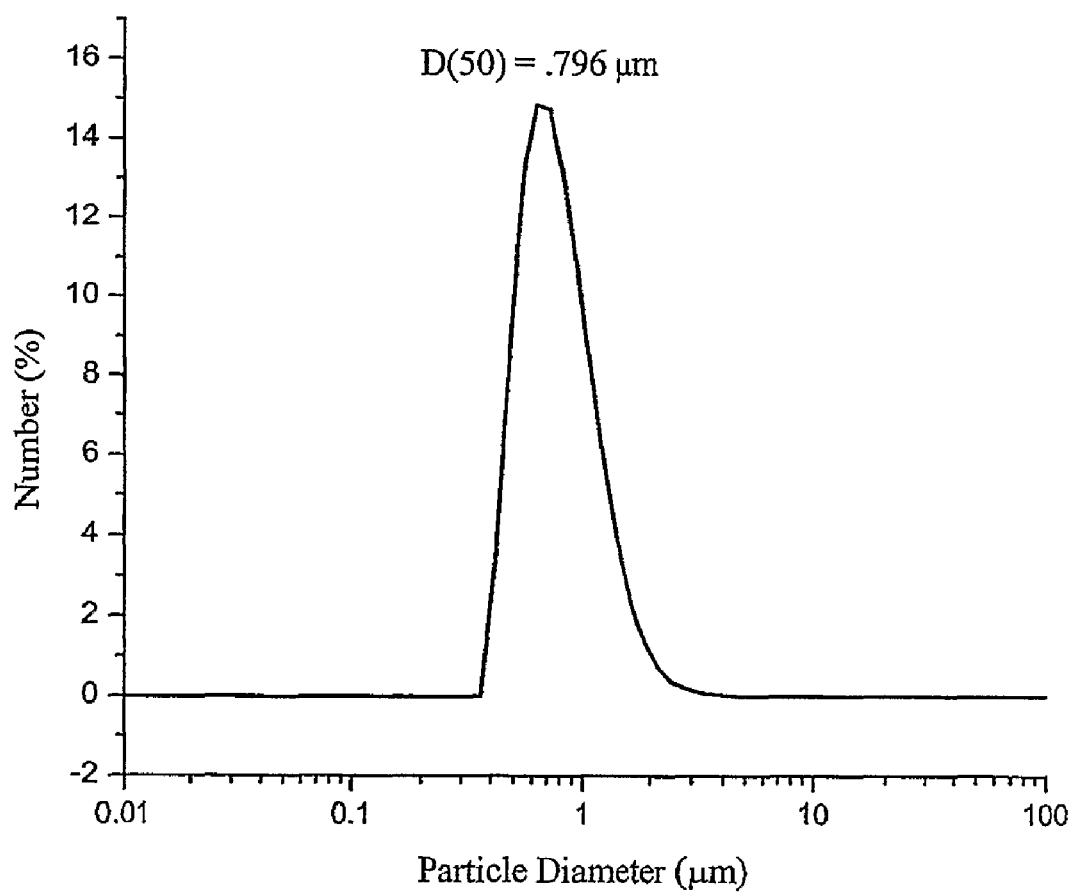
FIG. 2 illustrates the particle size distribution (PSD) of silver platelets produced as described in Example 1. The PSD was determined by laser diffraction using a Malvern 2000 size analyzer.

The particle size distribution was further confirmed by the laser diffraction technique using a Malvern 2000 size analyzer (FIG. 2), which indicated an average particle size of about 0.8 μm.

Figure 11:
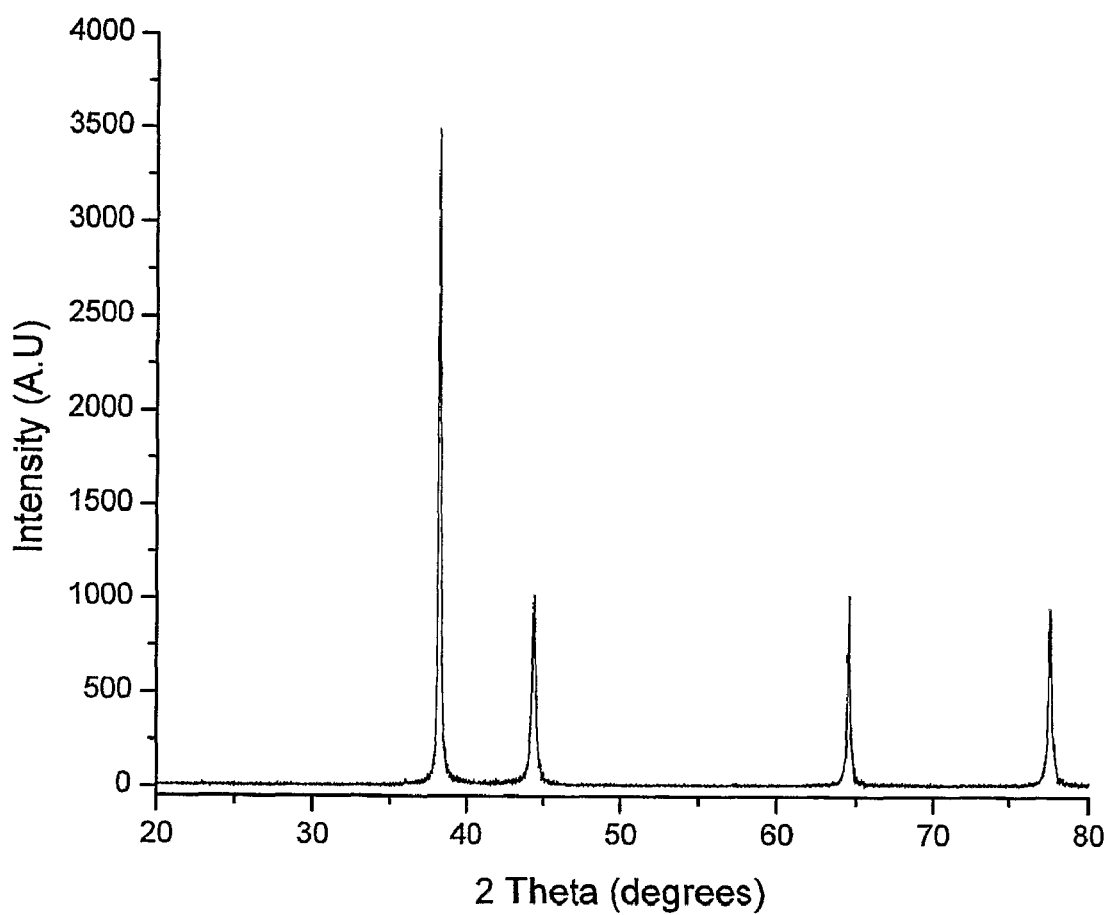
FIG. 11 shows the X-ray diffraction (XRD) pattern of silver platelets produced in accordance with one embodiment of the present invention.

FIG. 11 shows the X-ray diffraction (XRD) spectrum for silver platelets obtained by the process described above. The size of the constituent crystallites was deduced using Sherrer's formula for the (111) peak. By this method the constituent crystallite size was calculated to be 56 nm.

Example 2

Figure 3:
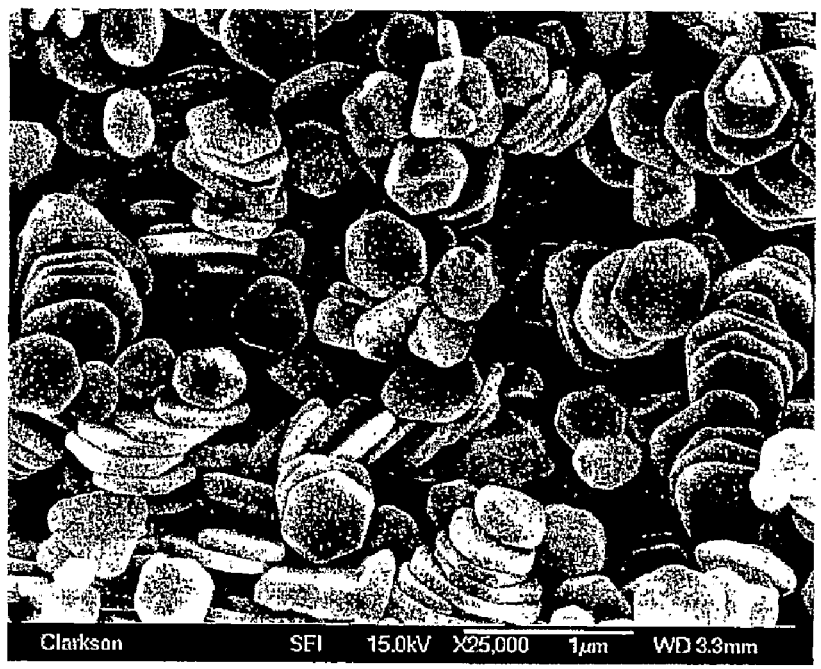
FIG. 3 shows an FE-SEM image at a magnification of 25,000× of silver platelets produced as described in Example 2.

Using the method as outlined in Example 1: the first part of the solution ($A_1$) was prepared by dissolving 19.2 g $AgNO_3$ in 112 ml $H_2O$ and then adding 1.608 g $Pd(NO_3)_2$ solution (15.0% Pd metal) providing a concentration of 0.94 M Ag and 0.02 M Pd (final volume: 120 ml). The second part ($A_2$) was prepared by dissolving 232.6 g $AgNO_3$ in $H_2O$ (final volume: 1330 ml), to provide an $AgNO_3$ solution. The reducing solution was prepared by dissolving 320 g ascorbic acid (Alfa Aesar, chloride level based on ascorbic acid of less than 10 ppm, equating to a level of less than 20 ppm based on silver) and 15 g gum arabic in 1600 ml $H_2O$. The acidic solution was prepared by dissolving 23 g gum arabic in 3200 ml $H_2O$, followed by the addition of 200 ml of concentrated $HNO_3$. The precipitation was carried out by the addition, in parallel, of the metallic precursor solutions (first the $A_1$ solution followed immediately by the $A_2$ solution) and the ascorbic acid solution, over 90 minutes, into the 3200 ml of acidified gum arabic solution, at room temperature and with moderate agitation. After conducting steps B, C, and D, the material was found to consist of silver platelets very similar to those derived in example 1. FIG. 3 shows an FE-SEM image of the silver platelets obtained in this example.

Comparative Example 3

Figure 4:
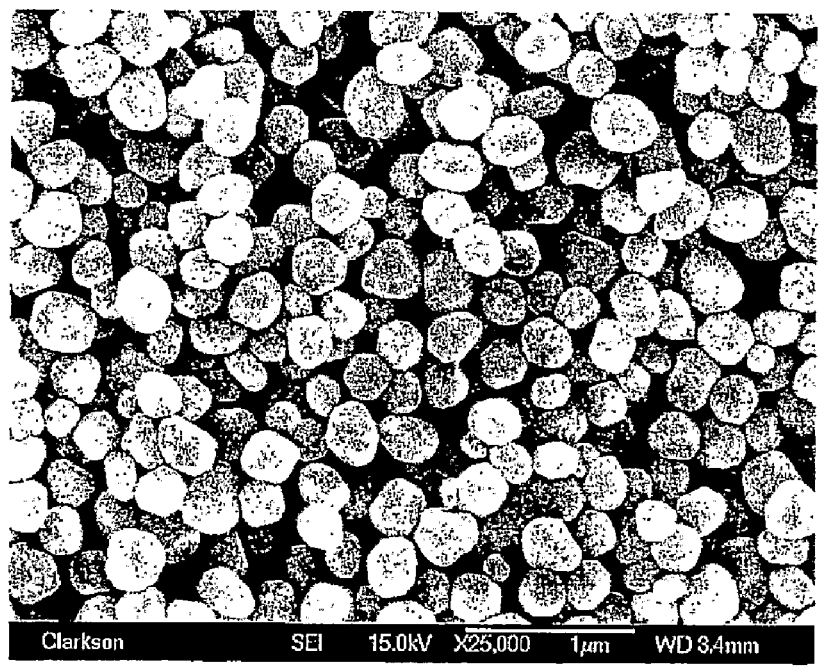
FIG. 4 shows an FE-SEM image at a magnification of 25,000× of silver particles produced as described in Example 3.

The procedure as outlined in example 2 was followed except that isoascorbic acid obtained from Sigma Aldrich was used in place of the ascorbic acid. The chloride level of the isoascorbic acid was determined to be 340 ppm, or 681 ppm based on the silver contained. Upon characterization, the material was found to consist of spherical silver particles with no nano-platelet formation. FIG. 4 shows an FE-SEM image of the silver particles obtained in this example.

Comparative Example 4

The procedure as outlined in example 2 was followed except that 0.4 ml concentrated hydrochloric acid (37%) was additionally added to the acid solution. The chloride level added via the hydrochloric acid was calculated to be 1064 ppm based on the silver contained. Upon characterization, the material was found to consist of spherical silver particles with no nano-platelet formation.

Example 5

Figure 5:
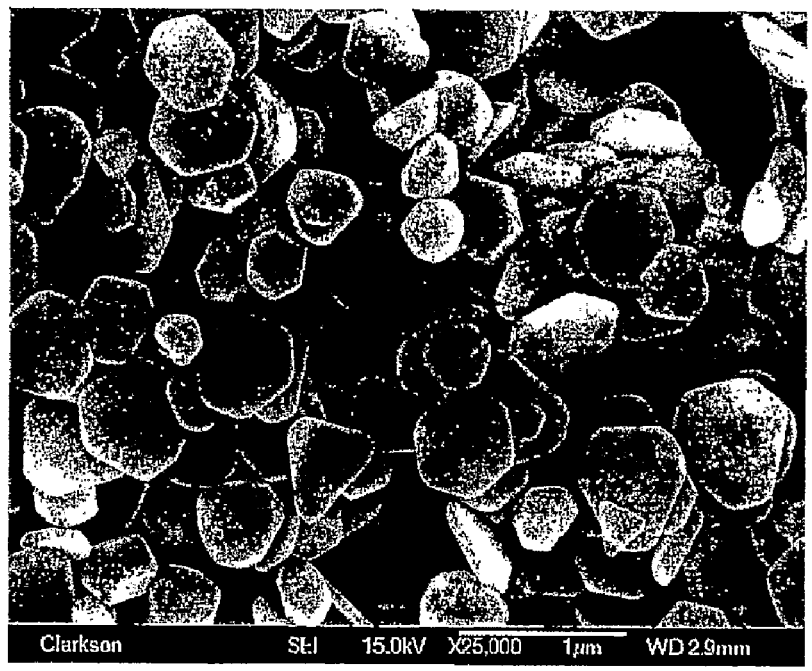
FIG. 5 shows an FE-SEM image at a magnification of 25,000× of silver platelets produced as described in Example 5.

Using the same method as outlined in Example 1, the first part of the solution ($A_1$) was prepared by dissolving 33.4 g $AgNO_3$ in 195 ml $H_2O$ and then adding 2.824 g $Pd(NO_3)_2$ solution (15.0% Pd metal) to provide a concentration of 0.94 M Ag and 0.02 M Pd (final volume: 120 ml). The second part ($A_2$) was prepared by dissolving 407.1 g $AgNO_3$ in $H_2O$ (final volume: 2330 ml), to provide an $AgNO_3$ solution. The reducing solution was prepared by dissolving 560 g ascorbic acid (Alfa Aesar, chloride level based on ascorbic acid of less than 10 ppm, equating to a level of less than 20 ppm based on silver) and 26.3 g gum arabic in 1600 ml $H_2O$. The acidic solution was prepared by dissolving 40.3 g gum arabic in 5600 ml $H_2O$, followed by the addition of 350 ml of concentrated $HNO_3$. The precipitation was carried out by the addition, in parallel, of the metallic precursor solutions (first the $A_1$ solution followed immediately by the $A_2$ solution) and the ascorbic acid solution, over 90 minutes, into the 5600 ml of acidified gum arabic solution, at room temperature and with moderate agitation. After conducting steps B, C, and D, the material was found to consist of silver platelets very similar to those derived in example 1. FIG. 5 shows an FE-SEM image of the silver platelets obtained in this example.

The parameters for the batch produced in this example and the batch produced in Example 2 are summarized in Table 1.

TABLE 1

|  | Example 2 | Example 5 |
|---|---|---|
| Batch Size (g) | 153 | 276 |
| Width Parameters |  |  |
| Avg. Width (nm) | 622.6 | 646.8 |
| Width St. Dev. (nm) | 78.6 | 108.7 |
| Minimum Width (nm) | 548.1 | 503.0 |
| Maximum Width (nm) | 821.0 | 975.2 |
| Width within 10% of mean | 60% | 60% |
| Width within 20% of mean | 92% | 72% |
| Width within 25% of mean | N/D | 96% |
| Thickness Parameters |  |  |
| Avg. Thickness (nm) | 81.6 | 64.0 |
| Thickness St. Dev. (nm) | 10.3 | 10.4 |
| Minimum Thickness (nm) | 66.7 | 42.6 |
| Maximum Thickness (nm) | 104.8 | 90.4 |
| Thickness within 10% of mean | 57% | 44% |
| Thickness within 20% of mean | 93% | 88% |

Example 6

99% Ag 1% Pd Platelets

Figure 6:
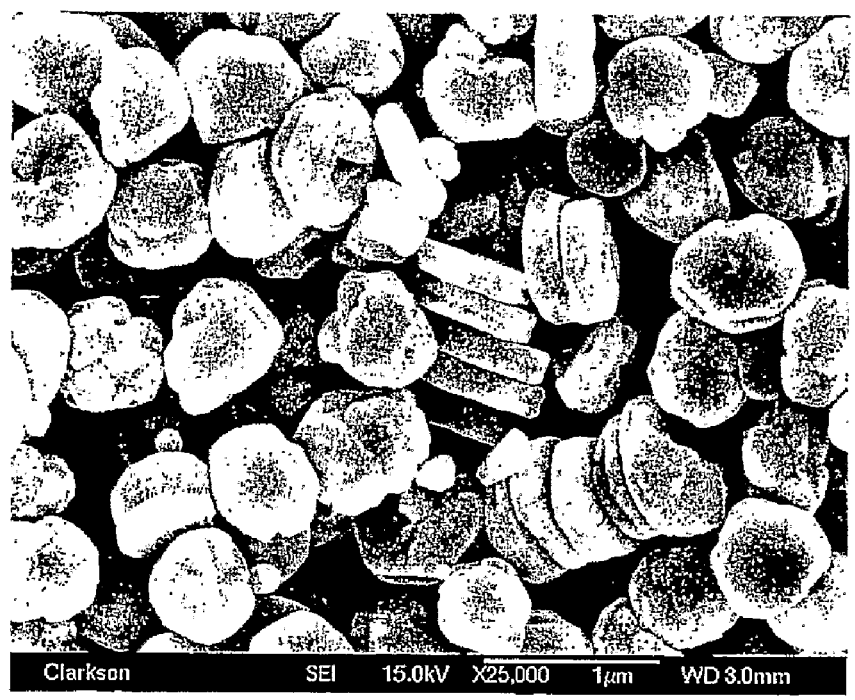
FIG. 6 shows an FE-SEM image at a magnification of 25,000× of silver platelets produced as described in Example 6.

Using the procedure as outlined in Example 1 except only one metallic precursor solution was prepared: the metallic precursor solution was prepared by dissolving 24.96 g $AgNO_3$ in 154 ml $H_2O$ and then adding 1.78 g $Pd(NO_3)_2$ solution (9.0% Pd metal) to yield a concentration of 0.95 M Ag and 0.0097 M Pd. After conducting steps B, C, and D, the material was found to consist of nano-platelets approximately 770 nm wide×190 nm thick. FIG. 6 shows an FE-SEM image of the silver platelets obtained in this example.

Example 7

98% Ag 2% Pd Platelets

Figure 7:
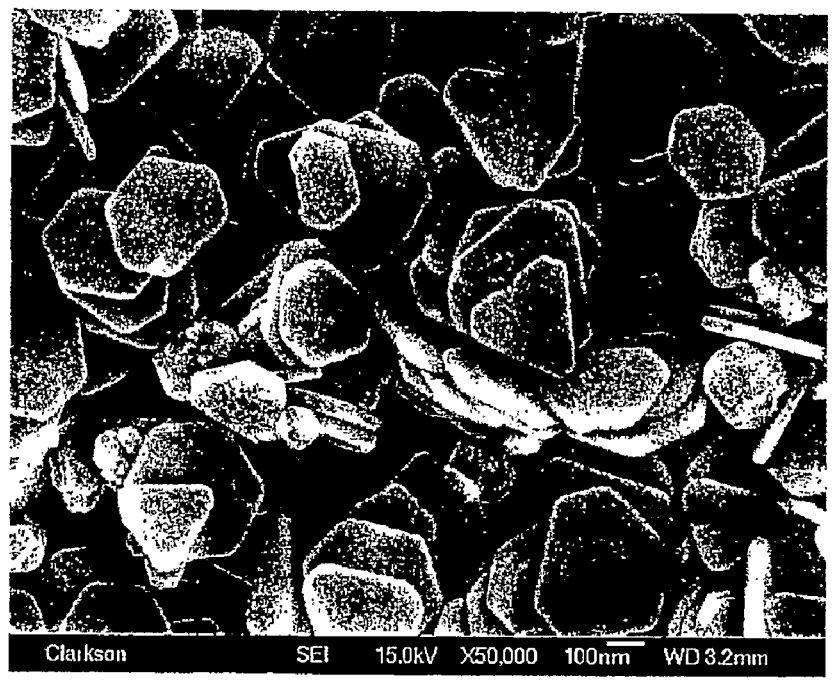
FIG. 7 shows an FE-SEM image at a magnification of 50,000× of silver platelets produced as described in Example 7.

Using the procedure as outlined in Example 1 except only one metallic precursor solution was prepared: the metallic precursor solution was prepared by dissolving 2.88 g $AgNO_3$ in 16.8 ml $H_2O$ and then adding 0.415 g $Pd(NO_3)_2$ solution (9.0% Pd metal basis) to provide a concentration of 0.97 M Ag and 0.02 M Pd. The metal solution was added at a rate of 1.68 ml/min for 10.5 minutes. After conducting steps B, C, and D, the material was found to consist of nano-platelets approximately 350 nm wide×36 nm thick. FIG. 7 shows an FE-SEM image of the silver platelets obtained in this example.

Example 8

98% Ag 2% Pd Platelets

Figure 8:
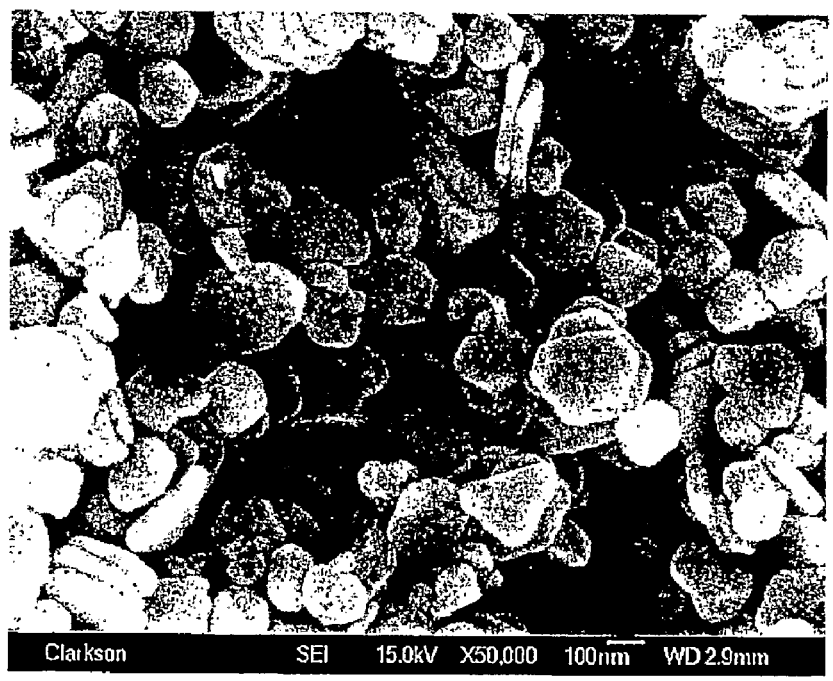
FIG. 8 shows an FE-SEM image at a magnification of 50,000× of silver platelets produced as described in Example 8.

Using the procedure as outlined in Example 1 except only one metallic precursor solution was prepared: the metallic precursor solution was prepared by dissolving 1.91 g $AgNO_3$ in 11.14 ml $H_2O$ and then adding 0.275 g $Pd(NO_3)_2$ solution (9.0% Pd metal basis) to provide a concentration of 0.99 M Ag and 0.021 M Pd. The acidic solution was prepared by dissolving 2.3 g gum arabic in 320 ml $H_2O$, followed by the addition of 60 ml of concentrated $HNO_3$, three times as much as added in Example 1. The metal solution was added at a rate of 1.68 ml/min for 7 minutes. After conducting steps B, C, and D, the material was found to consist of nano-platelets approximately 270 nm wide×40 nm thick. FIG. 8 shows an FE-SEM image of the silver platelets obtained in this example.

Example 9

95% Ag 5% Pd Platelets

Figure 9:
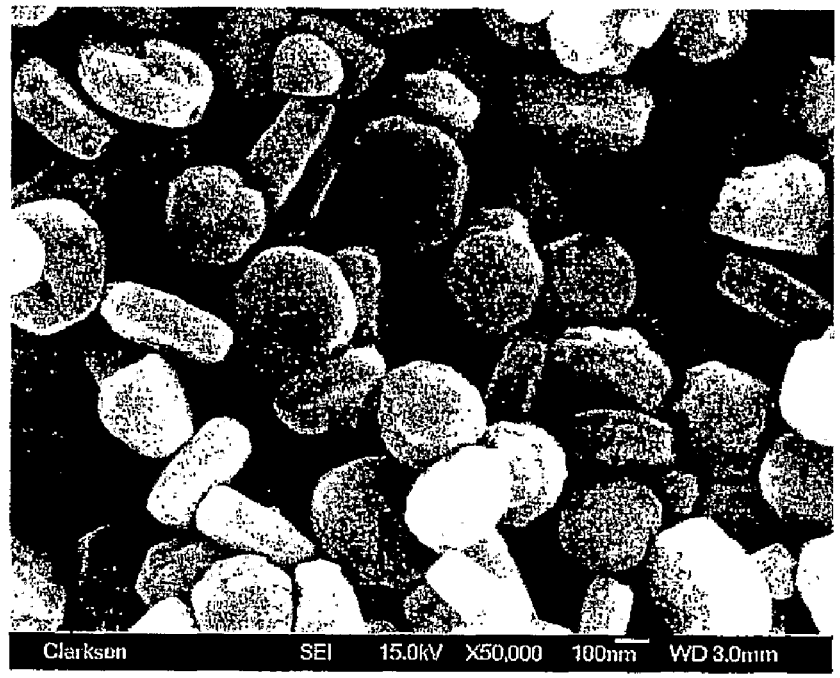
FIG. 9 shows an FE-SEM image at a magnification of 50,000× of silver platelets produced as described in Example 9.

Using the method as outlined in Example 1 except only one metallic precursor solution was prepared: the metallic precursor solution was prepared by dissolving 23.93 g $AgNO_3$ in 144 ml $H_2O$ and then adding 8.89 g $Pd(NO_3)_2$ solution (9.0% Pd metal basis) to provide a concentration of 0.94 M Ag and 0.05 M Pd. The metal solution was added at a rate of 1.68 ml/min for 90 minutes. After conducting steps B, C, and D, the material was found to consist of nano-platelets approximately 370 nm wide×130 nm thick. FIG. 9 shows an FE-SEM image of the silver platelets obtained in this example.

Example 10

90% Ag 10% Pd Platelets

Figure 10:
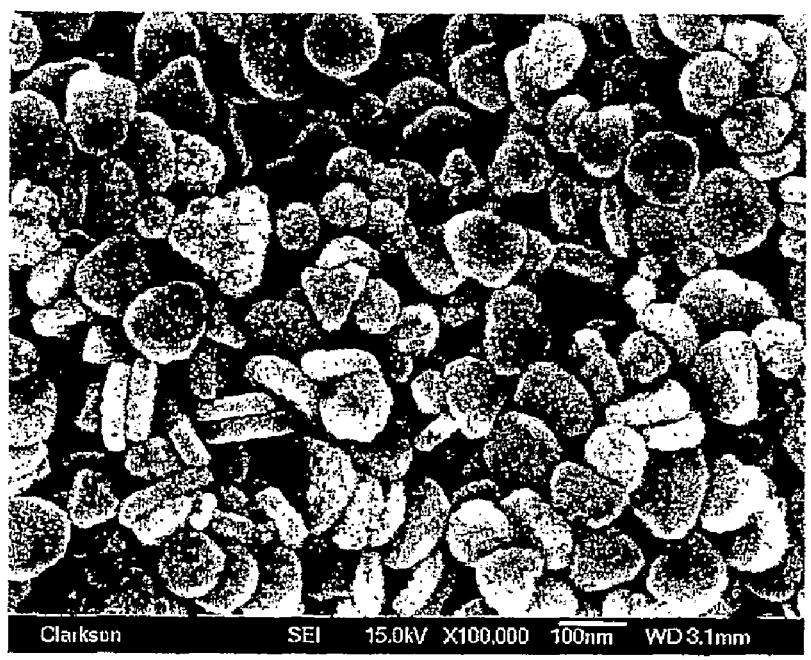
FIG. 10 shows an FE-SEM image at a magnification of 100,000× of silver platelets produced as described in Example 10.

Using the procedure as outlined in Example 1 except only one metallic precursor solution was prepared: the metallic precursor solution was prepared by dissolving 1.765 g $AgNO_3$ in 10.6 ml $H_2O$ and then adding 1.384 g $Pd(NO_3)_2$ solution (9.0% Pd metal basis) to provide a concentration of 0.90 M Ag and 1.02 M Pd. The metal solution was added at a rate of 1.68 ml/min for 7 minutes. After conducting steps B, C, and D, the material was found to consist of nano-platelets approximately 110 nm wide×35 nm thick. FIG. 10 shows an FE-SEM image of the silver platelets obtained in this example.

While the foregoing invention has been described in some detail for purposes of clarity and understanding, it will be appreciated by one skilled in the art, from a reading of the disclosure, that various changes in form and detail can be made without departing from the true scope of the invention as set forth in the appended claims.

We claim:

1. A metallic nano-platelet comprising between 90% and 99.99% silver by weight; and between 0.01% and 10% palladium by weight.

2. The metallic nano-platelet of claim 1, wherein the metallic nano-platelet comprises 99.1% or more silver by weight and 0.8% or less palladium by weight.

3. The metallic nano-platelet of claim 1, wherein the metallic nano-platelet comprises about 0.2% palladium by weight.

4. The metallic nano-platelet of claim 1, wherein the metallic nano-platelet comprises at least about 0.05% palladium by weight.

5. The metallic nano-platelet of claim 1, wherein the degree of crystallinity is at least 0.25.

6. The metallic nano-platelet of claim 1, wherein the degree of crystallinity is at least 0.5.

7. The metallic nano-platelet of claim 1, wherein the degree of crystallinity is about 1.

8. The metallic nano-platelet of claim 1, wherein the thickness of the metallic nano-platelet is from about 20 nm to about 300 nm.

9. The metallic nano-platelet of claim 1, wherein the width of the metallic nano-platelet is from about 100 nm to about 1000 nm.

10. The metallic nano-platelet of any one of claims 1-7, wherein the metallic nano-platelet has an aspect ratio between about 2 to about 20.

11. The metallic nano-platelet of any one of claims 1-7, wherein the metallic nano-platelet has an aspect ratio of at least about 5.

12. A plurality of the silver nano-platelets according to claim 1, wherein at least 90% of the silver platelets have a width within the range of W±20% W, where W is the mean width of the silver platelets.

13. The plurality of silver nano-platelets of claim 12, wherein at least 80% of the silver platelets have a thickness within the range of T±20% T, where T is the mean thickness of the silver platelets.

* * * * *